United States Patent [19]

Patterson et al.

[11] Patent Number: 5,491,733

[45] Date of Patent: * Feb. 13, 1996

[54] NUCLEAR FUEL ROD ASSEMBLY APPARATUS

[75] Inventors: John F. Patterson; George C. Cooke; Jack Yates; Trond A. Bjornard, all of Richland, Wash.

[73] Assignee: Siemens Power Corporation, Richland, Wash.

[*] Notice: The portion of the term of this patent subsequent to Sep. 6, 2011, has been disclaimed.

[21] Appl. No.: 65,727

[22] Filed: May 21, 1993

Related U.S. Application Data

[63] Continuation-in-part of Ser. No. 995,640, Dec. 17, 1992, Pat. No. 5,384,815, and a continuation-in-part of Ser. No. 995,633, Dec. 17, 1992, Pat. No. 5,375,153, which is a continuation-in-part of Ser. No. 850,532, Mar. 13, 1992, Pat. No. 5,345,485, said Ser. No. 995,640 is a continuation-in-part of Ser. No. 850,532.

[51] Int. Cl.⁶ .................................................. G21C 3/322
[52] U.S. Cl. ............................................................ 376/443
[58] Field of Search ............................... 376/371, 373, 376/377, 412, 443, 444, 435, 451, 453, 454

[56] References Cited

U.S. PATENT DOCUMENTS

| | | | |
|---|---|---|---|
| 2,980,667 | 4/1961 | Coombs | 376/455 |
| 3,787,286 | 1/1974 | Anthony | 376/454 |
| 4,675,154 | 6/1987 | Nelson et al. | 376/443 |
| 5,091,146 | 2/1992 | Dix | 376/443 |
| 5,130,082 | 7/1992 | Oosterkamp | 376/371 |
| 5,229,068 | 7/1993 | Johansson et al. | 376/443 |

FOREIGN PATENT DOCUMENTS

| | | |
|---|---|---|
| 0026029 | 4/1981 | European Pat. Off. . |
| 0505192 | 9/1992 | European Pat. Off. . |
| 0514117 | 11/1992 | European Pat. Off. . |
| 0523265 | 1/1993 | European Pat. Off. . |
| 0560169 | 9/1993 | European Pat. Off. . |
| 9210304 | 12/1992 | Germany . |
| 62-892 | 1/1987 | Japan ................ 376/444 |
| 3-51796 | 3/1991 | Japan ................ 376/443 |
| 3-183990 | 8/1991 | Japan ................ 376/443 |

*Primary Examiner*—Daniel D. Wasil
*Attorney, Agent, or Firm*—Ira Lee Zebrak

[57] ABSTRACT

The present invention provides a fuel rod for a light water nuclear reactors that comprises a part-length fuel rod and an extension tube having at least one wall member defining an enclosed flow path therethrough, the extension tube being coupled to a portion of the part-length fuel rod so as to be disposed axially above the part-length fuel rod, and including at least one inlet opening, for allowing fluid that surrounds the rod and initially comprises a two phase mixture of steam and liquid, to enter the enclosed fluid path and at least one outlet opening located above the inlet opening, the extension tube includes means for separating at least some of the steam located in the fluid from the liquid located therein. The improved fuel rod allows steam to bypass the upper active portions of the fuel assembly. A coolant diverter is positioned in a spacer of a nuclear fuel rod assembly in the large subchannel above a part length fuel rod for increasing the hydraulic resistance of the large subchannel and for separating liquid from two phase flow.

7 Claims, 12 Drawing Sheets

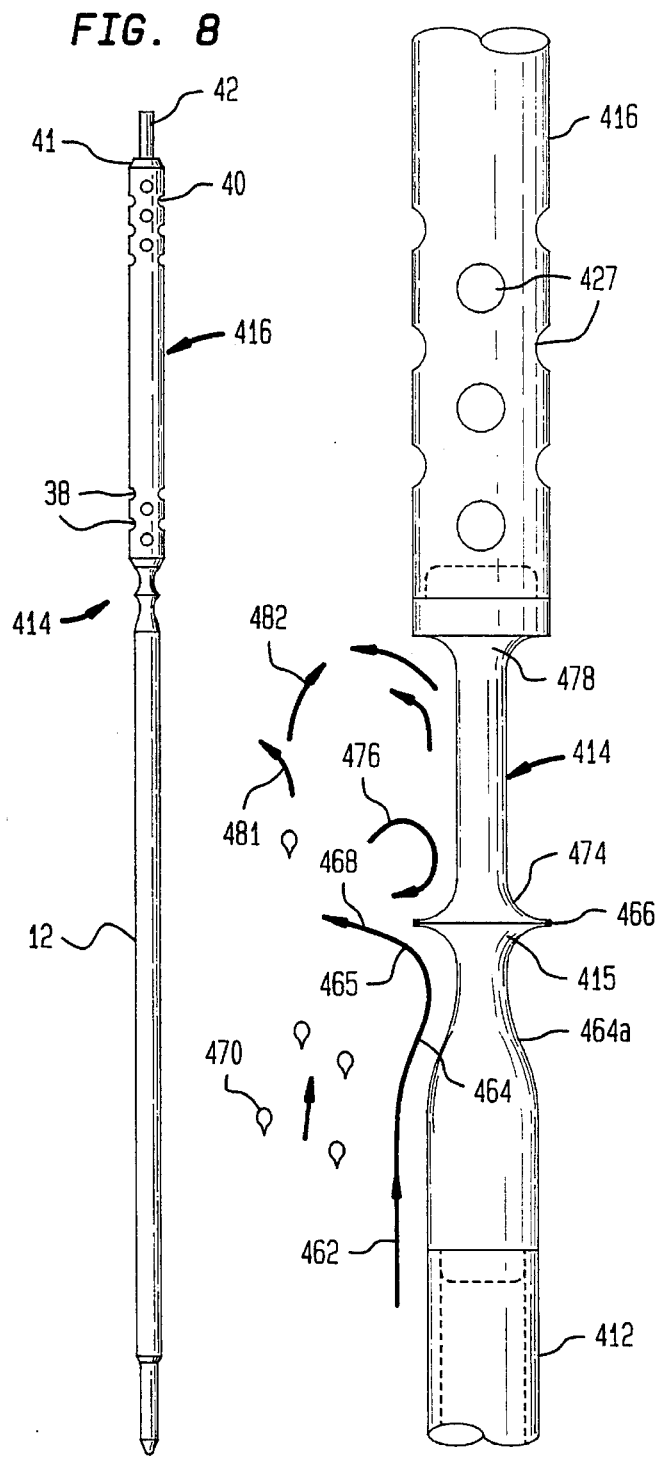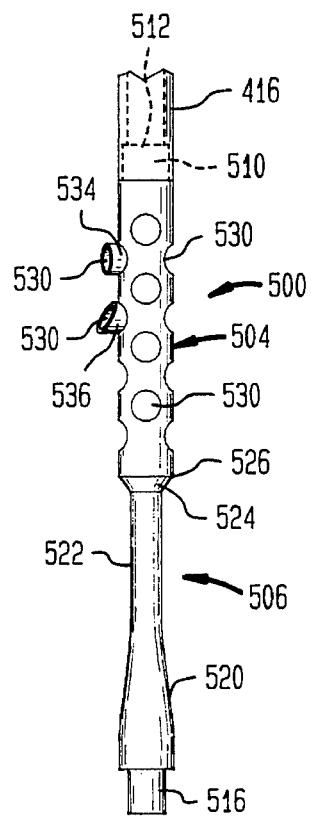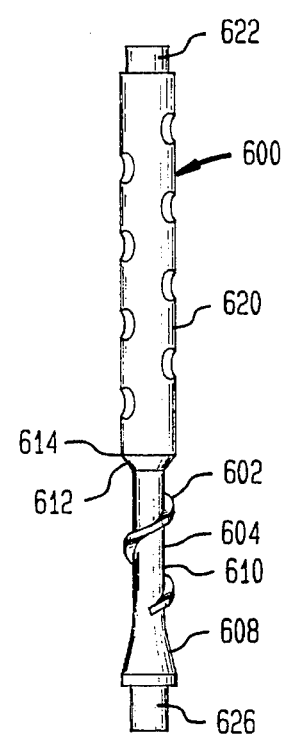

DIRECTION
OF COOLANT
MODERATOR FLOW

NUCLEAR FUEL ROD ASSEMBLY APPARATUS

This application is a continuation-in-part of U.S. Ser. No. 07/995,640 filed Dec. 17, 1992 now U.S. Pat. No. 5,384,815 and entitled COOLANT VENT FUEL ROD AND HYDRAULIC RESISTANT STRIP FOR A LIGHT WATER REACTOR which is a continuation-in-part of U.S. Ser. No. 07/850,532 filed Mar. 13, 1992 now U.S. Pat. No. 5,345,485 and entitled COOLANT VENT FUEL ROD FOR A LIGHT WATER REACTOR. This application is also a continuation-in-part of U.S. Ser. No. 07/995,633 filed Dec. 17, 1992 now U.S. Pat. No. 5,375,153 and entitled COOLANT VENT FUEL ROD AND PART LENGTH FUEL ROD HAVING A REFLEX UPPER END FITTING FOR A LIGHT WATER REACTOR which is also a continuation-in-part of U.S. Ser. No. 07/850,532 filed Mar. 13, 1992 now U.S. Pat. No. 5,345,485 and entitled COOLANT VENT FUEL ROD FOR A LIGHT WATER REACTOR.

BACKGROUND OF THE INVENTION

The present invention relates generally to nuclear fuel assemblies for use in nuclear reactors. More specifically, the present invention relates to a coolant vent duct for use in light water reactors, and more particularly to either a boiling water reactor or a pressurized water reactor. The coolant vent duct could be applied in conjunction with a part length fuel rod, with a water rod, with a water/fuel rod or simply by itself. In addition, the present invention relates to a hydraulic resistance strip positioned in the subchannel above a part length fuel rod to limit cross-flow from and between adjacent subchannels. In addition, the present invention relates to a part length fuel rod having an upper end fitting which functions to separate at least a portion of the liquid and the vapor portions of two phase flow. Furthermore, the present invention relates to a coolant diverter positioned within a fuel rod spacer of a nuclear fuel assembly for increasing the hydraulic resistance in the subchannels above part length fuel rods.

It is known to generate large amounts of heat and energy through nuclear fission in a nuclear reactor. Energy is dissipated as heat in elongated nuclear fuel rods. Typically, a nuclear fuel assembly includes a number of nuclear fuel rods that are grouped together to form a nuclear fuel assembly. Such fuel assemblies include a number of elongated rods supported between upper and lower tie plates.

It is known in boiling water reactor (BWR) fuel designs to include within fuel assemblies part-length fuel rods. Accordingly, some of the fuel rods in a bundle are truncated at some intermediate elevation in the core. This leaves an unfilled coolant channel above that elevation. By providing a truncated fuel rod, several important benefits are achieved. For example, there is a neutronic advantage in increasing the amount of fuel in the bottom of the core as compared to the top of the core. A more axial uniformity in water to fuel ratio is thereby achieved with an associated improvement in fuel cycle costs, increased shut-down margin, reduced pressure drop (principally because of increased flow area, but decreased wetted surface also reduces the pressure drop), and increased core stability because the pressure drop reduction occurs at the top part of the bundle where two phase pressure drops are most significant.

Potentially, the part-length fuel rod could yield a small critical heat flux (CHF) benefit because of the reduced mass flux in the top part of the bundle. This potential is generally not achieved. An important factor is considered to be that the simple truncation of the part-length fuel rod results in large open subchannels that have less power density than the other subchannels in the bundle. This results in significant non-uniformities of subchannel enthalpy rises.

Effectively, the flow in the other regular subchannels is reduced by a factor greater than one would expect merely from the increase in the bundle flow area that occurs above the top end of a part length fuel rod. Mixing devices and flow strippers have been utilized in an attempt to offset this problem somewhat at the expense of added pressure drop.

A number of part length fuel rod constructions have been utilized in the prior art.

U.S. Pat. No. 4,664,882 discloses a segmented fuel and moderator rod and fuel assembly for a boiling water reactor. The segmented rod has a lower fuel region and an upper moderator region for passing coolant through the upper portion of the boiling water reactor core which is normally undermoderated. The segmented rod displaces one or more conventional fuel rods in the fuel bundle.

U.S. Pat. No. 2,998,367 discloses a core that includes short fuel rods, rods of intermediate length, and rods extending the full height of the core, immersed in light water.

U.S. Pat. No. 4,789,520 discloses in an embodiment a fuel assembly having six fuel rods, each having a short fuel effective length portion in comparison to other fuel rods that are included in order to reduce the pressure loss within the fuel assembly.

U.S. Pat. No. 4,957,698 discloses a fuel design that preferentially directs more unvoided water coolant into the upper region of the fuel assembly. This allows relatively more fuel to be placed in the lower portion of the fuel assembly. The arrangement is designed to allow moderation of neutrons in the upper portion of the assembly while preserving a higher volume of fuel in the lower portion. The larger number of fuel rods that can be used in the lower portion reduces the linear heat generation (power peaking) in the assembly.

U.S. patent application Ser. No. 07/737,859, filed on Jul. 30, 1991, entitled: "IMPROVED FUEL ASSEMBLY FOR BOILING WATER REACTORS", and assigned to the assignee of this patent application discloses, in part, a fuel assembly.

SUMMARY OF THE INVENTION

The present invention provides a coolant vent duct structure to be preferably located above a part-length fuel rod portion that improves critical heat flux (CHF) performance with respect to typical part-length fuel rods without significant degradation of the benefits that are achieved by using such a system, e.g., improved fuel utilization, stability, and shut down margin. The present invention improves CHF performance by providing a better matching of subchannel hydraulic resistance to subchannel power in the top part of the bundle for the subchannels adjacent to these rods. A reduction of active flow channel enthalpies, i.e., void fraction, in the top part of the bundle is achieved by the structure of the present invention. The inventive coolant vent duct is not limited to use above a part-length fuel rod, it may be used above a water rod or a water/fuel rod or alone.

To this end, in an embodiment, the present invention provides a duct structure that provides a hollow tube that is located above and is mechanically connected to the part-length fuel rod of a boiling water reactor fuel assembly. The duct structure can include an extension tube having at least one wall member defining an enclosed flow path therethrough, the extension tube being coupled to a portion of the part-length fuel rod so as to be disposed axially above the part-length fuel rod, and including at least one inlet opening, for allowing a portion of a fluid that surrounds the rod, that initially comprises a two phase mixture of steam and liquid, to enter the enclosed fluid path, and including at least one outlet opening located above the inlet opening, the extension tube can further include means for separating at least some of the steam located in the fluid from the liquid located therein. The structure allows steam to bypass the upper active portions of the fuel assembly.

To accomplish this separation, the means can direct liquid water from the inlet holes while allowing steam to enter, or the means can entail directing water out of the duct while permitting the steam flow to continue flowing upwards inside the duct.

In an embodiment, the duct includes a transition section and an upper section, the upper section having an outer perimeter greater than the outer perimeter of the fuel rod below. The inlet holes can be located in the upper section or the transition section or both. The upper section need not be round in cross section but preferably is round and is larger in diameter than the fuel rod below.

In one form, the duct is a circular tube that has holes drilled into it and the transition piece merely provides a mechanical connection of the lower part-length fuel rod and the upper extension tube. This arrangement has some capability for separating steam from liquid because, owing to their greater inertia, the liquid drops flowing upwards towards the inlet holes are not as readily turned into the holes as is the steam. A drawback, especially when only a small amount of flow is taken into the extension tube, is that the liquid film that is on the surface of the rod can be drawn more readily into the holes, making separation performance less than desired.

In an embodiment, the means for separating liquid from steam is located on an outer portion of the wall outside the enclosed area in juxtaposition to the inlet opening or openings. The means for separating directs liquid away from the inlet opening causing the fluid that enters an inlet opening to comprise a greater percentage of steam. For example, the means can comprise a V-shaped member extending from the outer wall upstream and adjacent to an opening.

Assembly of this invention into the fuel bundle can impose dimensional limits on the radial extent of the V-shaped members or other means for diverting liquid films and drops from the inlet holes. For example, assembly of the bundle typically begins with a skeleton consisting of the lower tie plate, tie rods, and all the spacers. The remaining rods including the structure of this invention are then inserted through the openings in the spacers. The width of the openings for those cells which will contain this invention will be only slightly greater than the outside diameter of the upper tube. Thus, the radial extent of the means for diverting liquid away from the holes is limited to fall within the square envelope of the openings in the upper spacers. Once inserted through the spacers this invention may require rotation for optimum alignment of the inlet openings relative to the surrounding subchannels.

An embodiment demonstrates that more flexibility as to the radial extent of the protruding members can be gained by locating the inlet holes into a hollow transition piece (hollow except at the bottom thereof) and which would have a local diameter (not including the protruding members) that is less than the diameter of the upper tube.

An exemplary embodiment shows a different means of achieving sufficient separation performance. The liquid diverter is located upstream (i.e., below) of a group of inlet openings and serves to divert liquid away from all the openings in this group. For simplicity, the inlet openings are in the duct and a transition connector piece serves as the diverter. This means of liquid diversion includes one or more protrusions from the minimum section of the transition connector. Generally, there will be at least one protrusion at the top as the connector expands to the diameter of the upper tube. To be effective, the protrusions must have a reasonably sharp break in their surface so that the liquid film flowing radially outwards along the face of the protrusion will depart the surface and continue to move radially away from the transition connector piece.

A double protrusion transition connector piece with a number of geometric characteristics to promote separation of liquid and steam can be utilized. The geometric characteristics are:

(1) a smooth and gradual reduction in diameter moving axially upwards along the transition connector piece from the bottom end; the diameter is decreased so the subsequent protruding surfaces present a greater diversion of the overall flow from an axial to a radial direction; the diameter reduction is gradual so that the liquid film stays attached to the surface upstream of a first protrusion;

(2) the first protrusion is shaped so that the liquid film will follow a smooth curved arc path as its flow direction is changed to have a large radial component;

(3) the first protrusion ends in a sharp break and has only a small axial extent (i.e., the transition piece diameter is again reduced); this second reduction in diameter is done purposefully so that the recirculating flow behind the separating film acts to promote radial separation by providing a recirculating stream that joins with the separating film in a smooth tangential manner; the film separates as a continuous sheet of liquid that collides with the main axial flow of liquid drops and steam; this collision imparts outward radial momentum to the liquid drops that were flowing axially so as to move liquid in general radially away from the downstream inlet openings;

(4) the second protrusion occurs as the transition connector piece is flared outwards to have the diameter of the upper tube.

In this embodiment, the first protrusion takes the form of a ring shaped tapering disk located about the small diameter section of the transition connector piece. Another approach would be to use partial or segmented rings that are displaced axially that do not have a full 360° extent at any one location. This approach can allow steam to pass more easily towards the inlet holes by flow around the ends of the liquid film sheets as opposed to having to penetrate the sheets as they start to breakup into drops.

Another approach to separate liquid from steam ahead of the inlet holes would be to use turning vanes to give an azmathal or circular component to the flow in addition to its axial component. The addition of a swirling or twisting component to the flow is a common approach to achieving separation of liquid from steam since the liquid has more of a tendency to move outwards in response to centrifugal forces than does the steam.

In another embodiment, the means for separating is located within the enclosed area of the duct, for example, the means for separating can comprise means for imparting a centrifugal force to the two phase mixture. If desired, at least two means for separating can be provided, one located within the enclosed area of the duct and the other on an outer wall portion of the duct to achieve a more complete separation of the steam from the liquid.

In addition, the present invention provides a structure for a light water reactor fuel assembly having a part length fuel rod and a hydraulic resistance strip having a predetermined amount of hydraulic resistance, the strip being connected to an end of the part length fuel rod, the strip having an elongated continuous body defining an outer wall and having a cross-sectional area substantially less than the cross-sectional area of the part length fuel rod, the body being disposed axially above the part length fuel rod.

The present invention provides a fuel rod for a light water reactor having a part length fuel rod portion and a reflex upper end fitting for separating at least a portion of the liquid and the vapor of two phase flow. The reflex upper end fitting is disposed axially above the part length fuel rod and in contact with the downstream end of the part length fuel rod. The reflex upper end fitting comprises a section having a diameter tapering downwardly into a reduced diameter and flaring thereafter into a second diameter terminating in a sharp break at a line around its perimeter, the tapering and flaring producing a smooth flow path for propelling fluid flowing therealong, radially inwardly and then outwardly from the downstream end of the part length fuel rod.

In accordance with another aspect of the invention, a coolant diverter is provided for a nuclear reactor fuel assembly having a plurality of substantially parallel, elongated fuel rods. The coolant diverter comprises a stem portion and a flared diverter portion. The flared diverter portion is integrally formed with the stem portion so as to have a smooth, continuous, trumpet-like outer surface. The coolant diverter is for being mounted in a nuclear reactor fuel assembly for diverting at least a portion of the liquid coolant in a two phase coolant flow onto adjacent fuel rods.

In a preferred form, the coolant diverter includes means for mounting the coolant diverter within a spacer for the fuel rods. The means for mounting preferably includes a diverter tube; the stem portion is disposed in the diverter tube; the diverter tube also is for guiding the two phase coolant flow along the coolant diverter.

In accordance with this aspect of the invention, a nuclear reactor fuel assembly comprises a plurality of elongated fuel rods, means for supporting the fuel rods in spaced, substantially parallel relation where the supporting means includes a spacer for the rods, a coolant diverter and means for mounting the coolant diverter in the spacer. The coolant diverter has an elongated stem portion and a flared diverter portion integrally formed with the stem portion so as to have a smooth, continuous trumpet-like outer surface. The diverter portion terminates in a sharp break end portion. The coolant diverter is for diverting at least a portion of the liquid coolant in a two phase coolant flow onto adjacent fuel rods.

In a preferred form, the nuclear fuel assembly has mounting means which includes a diverter tube for mounting the stem portion of the coolant diverter and for guiding the two phase liquid coolant flow along the coolant diverter. The diverter tube is mounted in the spacer.

In one arrangement of the nuclear fuel assembly in accordance with the invention, the fuel assembly includes a part length fuel rod and the coolant diverter is positioned downstream of the part length fuel rod.

In another arrangement of the nuclear fuel assembly in accordance with the invention, the coolant diverter is arranged between adjacent fuel rods.

Additional features and advantages of the present invention are described in, and will be apparent from, the detailed description of the presently preferred embodiments and from the drawings.

BRIEF DESCRIPTION OF THE DRAWINGS

FIG. 8 illustrates a perspective view of another embodiment of a coolant vent duct of the present invention.

FIG. 9 illustrates an enlarged perspective view of a coolant vent duct inlet region of FIG. 8.

FIG. 10 illustrates a perspective view of an embodiment of the transition/connector piece of the present invention.

FIG. 11 illustrates a perspective view of a further embodiment of the transition/connector piece of the present invention.

FIG. 17b illustrates an enlarged view of a portion of the assembly shown in FIG. 17a.

FIGS. 19aa and 19bb illustrate cross-sectional views of the hydraulic resistance configurations in FIGS. 19a and 19b with concave surfaces.

DETAILED DESCRIPTION OF THE PRESENTLY PREFERRED EMBODIMENTS

The present invention provides a coolant vent structure to be used alone in a bundle, in conjunction with a lower water rod, or in conjunction with a combination rod of water and fuel elements, or in conjunction with a part length fuel rod.

In the latter case, the arrangement is particularly advantageous for improving CHF performance while retaining the benefits of a part-length fuel rod. The coolant vent duct is thus located above a part-length fuel rod. The duct can include a hollow tube extension that has one or more inlet openings at a bottom thereof and one or more outlet openings at a top thereof. Accordingly, some of the reactor coolant, that is a two phase mixture, passes inside the hollow tube extension. Due to the structure of the coolant vent fuel rod, at least a partial separation of the steam and liquid of the two phase coolant that surrounds the tube is achieved by the hollow tube extension. This allows coolant with a higher steam content to bypass the upper active portions of the fuel assembly.

The structure of the present invention reduces the enthalpy rise maldistribution problem by providing active flow subchannels outside of and adjacent to the coolant vent duct that are much smaller than in the case of a part-length fuel rod without a duct. The coolant vent duct also provides an isolated inactive flow path inside of the duct so as to retain a significant part of the pressure drop reduction that occurs with a part-length rod. The coolant vent duct achieves a significant part of the part length rod pressure drop reduction because it provides most of the flow area gain that one achieves with a part-length fuel rod.

The coolant vent duct can function as a steam extraction device. Specifically, the geometry of the inlet region of the coolant vent duct can be configured to achieve significant separation of steam from water such that the coolant with the increased steam content flows inside the hollow duct while the remaining coolant with increased liquid water content continues up the active flow channels. This coolant with increased liquid water content enables generally better cooling of the nuclear fuel rods and thus enables improved CHF performance.

With either a part-length rod alone or with the coolant vent duct of the present invention, the improvement in pressure drop relative to having full length fuel rods is controllable via the number of such rods and the length of the fuel section of the rods. The trade off on whether to adjust the number or the length is made so as to yield favorable neutronics performance. The coolant vent duct of the present invention allows for fine tuning the pressure drop by using the flow holes in the coolant vent duct to meter the amount of flow that will go inside the coolant vent duct.

Figure 1:
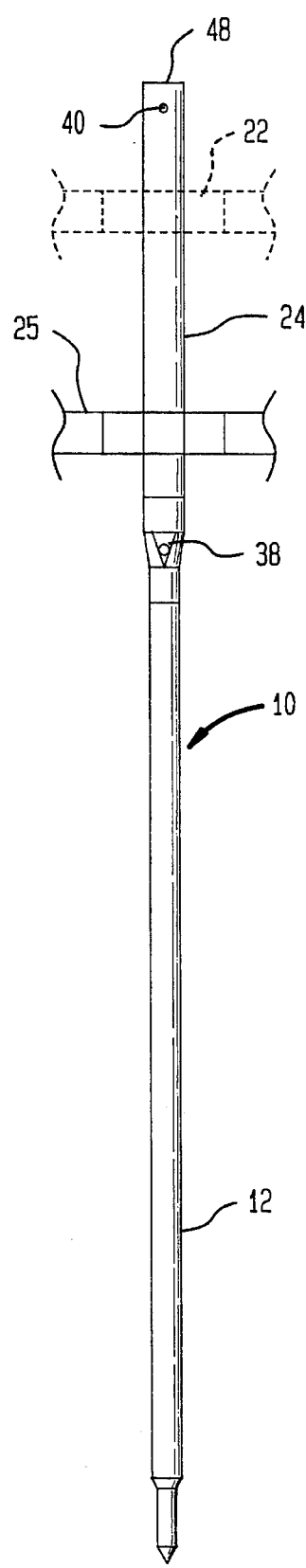
FIG. 1 illustrates a perspective view of an embodiment of a coolant vent duct and partial fuel rod of the present invention.
Figure 2:
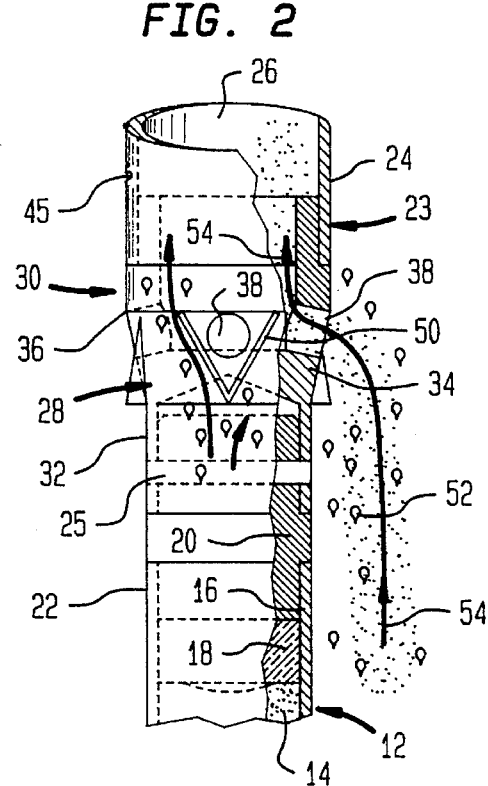
FIG. 2 illustrates an enlarged perspective view with parts broken away of the embodiment of a coolant vent duct illustrated in FIG. 1.

Referring now to the Figures, and specifically to FIGS. 1 and 2, an embodiment of a combination coolant vent duct and part length fuel rod 10 of the present invention is illustrated. As illustrated, a part-length fuel rod 12 is provided that includes a fuel portion 14 that is located within the cladding 16 of the rod. The upper end of the part-length fuel rod 12 includes an insulator disk 18 that can be preferably constructed from $Al_2O_3$.

Additionally, the part-length fuel rod 12 and includes a connector member 20 that is received by and extends from an end 22 of the part-length fuel rod 12. The connector member 20 allows a coolant vent duct 23 having an extension tube 24 to be coupled to the part-length fuel rod 12 and disposed axially thereto. In the preferred embodiment illustrated, a horizontal pin 25 is provided for proper rotational alignment.

The duct 23 extends vertically to the vicinity of the upper spacer 22 shown in FIG. 1, or to some point above the upper spacer (see FIG. 8). The duct could extend all the way up to the upper tie plate (not shown) in which case there would be a means for fixing the upper end such as an upper end cap 41 and locating pin 42 (see FIG. 8). The connector member 20 may be an assemblage of smaller pieces. Among other functions the connector member 20 can serve as an upper end cap to the part length fuel rod 12 below and as a mechanical connection between the part length fuel rod 12 and the coolant vent duct 23.

The extension tube 24 includes a hollow interior 26 that provides a coolant flow path. The duct 23 also includes a transition portion 28 and an upper portion 30 formed together or bonded together. The upper portion 30 has an outer perimeter, or diameter, that is greater than the outer perimeter of the part-length fuel rod 12. Because the outer perimeter of the upper portion 30 and the tube 24 is greater than the outer perimeter of the part-length fuel rod 12, a more radial uniform enthalpy distribution among the active flow channels is achieved.

The transition portion 28 has a lower section 32 that has a substantially constant outer perimeter, and has a tapered section 34 thereabove. The tapered section 34 and lower section 32 are formed together or attached together. The lower section 32 has an outer perimeter approximately equal to the outer perimeter of the part-length fuel rod 12. The outer perimeter of the transition portion 28 increases in the tapered section 34 to a point where the upper portion 30 begins. Preferably, at the end of the transition portion 28, there is a sharp break 36 that functions to assist in stripping liquid film off the outside surface of the coolant vent fuel rod 10.

As illustrated in FIG. 2, the duct 23 can include a plurality of inlet openings 38 located in the transition portion 28. The inlet openings 38 allow a fluid to enter into the interior 26 of the extension tube 24. In a preferred embodiment, four inlet openings 38 are provided; one inlet opening 38 being aligned with each of the four subchannels that surround the combination coolant vent fuel rod 10.

At an upper portion of the extension tube 24, outlet openings 40 are provided. These outlet openings can be a grouping of openings around the tube circumference as shown in FIG. 8. The outlet openings 40 allow fluid to exit the enclosed area 26 defined by the extension tube 24.

The principle section of the extension tube 24 could be round, square, or some other shape that provides an open interior. The extension tube surface can have a local distortion 45 at certain elevations to facilitate mechanical interfacing with the spacers 22, 25 and mating with the upper portion 30 or upper end cap 41 if any.

This invention has inlet openings 38 either in the extension tube 24 or the transition portion 28 and outlet openings 40 to enable upwards flow of the reactor coolant inside of the duct 23. There may be additional openings over the length of the duct either to admit flow into or exhaust flow from the interior 26 of the duct. The openings could also be simply open end or ends of the duct such as at the top 48 of extension tube 24 shown in FIG. 1.

The mechanical connection of the lower part length fuel rod 12 and the upper tube 24 is a desirable feature but not a mandatory feature of this invention. When there is no connection the hollow tube 24 is located above a part length rod and has some means for admitting flow into the region inside the tube at the bottom and for exhausting flow at the top. The spacers provide lateral restraint when this invention is either connected or unconnected to the part length rod. When not connected to the part length rod below, vertical restraint of this invention would be provided by either the spacers or the upper tie plate. For example, locking tabs could be added to the outside surface of the tube or the tube could be distorted locally at one or more spacer elevations in such a way that if the tube is rotated 45° it would lock into place and could not be removed vertically unless rotated again. In simple form, a hollow tube is placed axially above a part length fuel rod, and serves to add hydraulic resistance in a region that would otherwise be a large open subchannel. The addition of hydraulic resistance reduces subchannel flow and thereby provides a means to correct the enthalpy rise maldistribution problem of the prior art (i.e., fuel bundles with part length fuel rods). With a simple hollow tube form of this invention either the top or bottom (or both) ends of the tube might be deformed in such a way as to exert control over the amounts of liquid water and steam flows entering the tube. A transition piece and holes in the sides of the tube may or may not be present.

In the embodiment illustrated in FIG. 2, a liquid diversion structure 50 is provided. In FIG. 2, the liquid diversion structures 50 extends outwardly from the transition portion 28, in juxtaposition to the inlet opening 38. In the embodiment illustrated, the liquid diversion structure 50 has a "V" shaped fence. Of course, other shapes and structures can be used to create a liquid diversion.

The liquid diversion structure 50, as illustrated, is so constructed and arranged that liquid, such as droplets 52 in the two phase mixture, that are near the surface as well as the liquid film on the surface, are diverted away from the inlet opening 38 while steam 54 is allowed to enter the inlet opening 38. The V-shaped fence 50 diverts the liquid film flowing up the surface of the part length rod 12 below around and away from the inlet opening 38. It also provides an obstacle for steam and liquid drop flow near the surface of the combination coolant vent fuel rod 10 that is headed for the inlet opening. This obstacle is more easily negotiated by the steam than drops. This maximizes the steam quality of the fluid flowing into the interior 26 of the extension tube 24. By causing steam to enter the extension tube 24, and therefore, exit at the outlet openings 40 or 48 of the extension tube 24, one is able to maximize the liquid available for cooling the active fuel rods while maintaining sufficient flow inside the extension tube 24 to achieve the desired reduction and bundle pressure drop.

The liquid diversion structures 50 provide at least some separation of vapor from liquid at the inlet opening 38 of the extension tube 24. This allows one to achieve a separation of the two phases as soon as practical after the fuel section of the part-length fuel rod 12.

The increased diameter or size of the upper portion 30 of the extension tube 24, with respect to the transition portion 28, also facilitates flow separating inlet designs by allowing the liquid diverting structure 50, or other protrusion, to be located in the vicinity of flow inlet openings 38 without compromising fuel loadability into the bundle. For example, as illustrated in FIG. 2, the V-shaped fence 50 does not protrude beyond the outer circumference of the extension tube 24. Hence, coolant vent duct loading is not compromised.

As set forth above, pursuant to the present invention, the transition portion 28 preferably has increasing diameter as one moves upwards and ends with a sharp break 36 to help strip off the liquid film on the outside surface of the rod. Additional film stripping means could be included over the length of the hollow tube 24 to minimize the liquid flow on the surface. The tube extension 24 could be truncated at the top spacer or it could be continued up to the upper tie plate with multiple outlet holes above the last spacer to minimize the hydraulic resistance of the flow leaving the coolant vent duct 10 (see FIG. 8).

Figure 3:
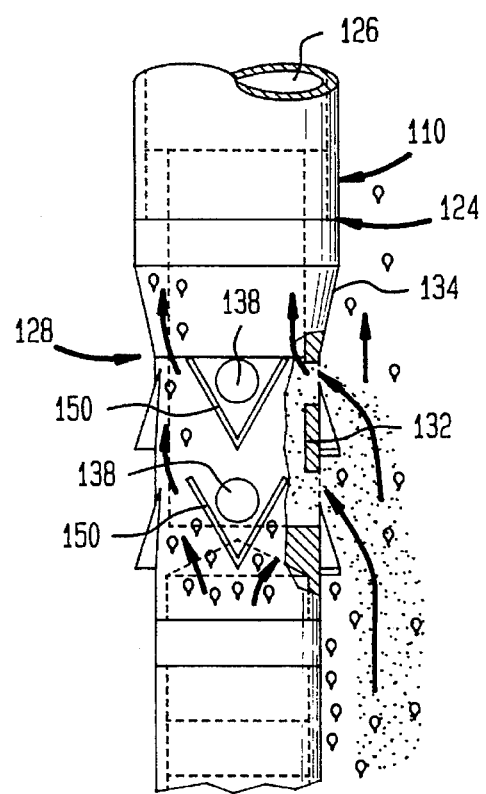
FIG. 3 illustrates an enlarged perspective view with parts broken away of another embodiment of a coolant vent duct of the present invention.

Referring now to FIG. 3, an embodiment of the coolant vent fuel rod 110 of the present invention is illustrated. In this embodiment, inlet openings 138 are located in a transition portion 128 of this invention. In this embodiment, the openings 138 are located in a lower section 132 below a tapered section 134 of the transition portion 128. As illustrated, in this embodiment, several inlet openings 138 are located one after the other. Each opening 138 includes a liquid diversion structure 150 located in juxtaposition to the opening. Again, the structure 150 limits the liquid that enters the openings 138. In all other aspects, the coolant vent duct 110 is similar to the embodiment illustrated in FIGS. 1 and 2.

By having several inlet openings 138 one after the other, the openings provide a larger total inlet flow hole area if this is necessary to achieve sufficient flow inside the coolant vent fuel rod to achieve the necessary reduction and bundle pressure drop.

Figure 4:
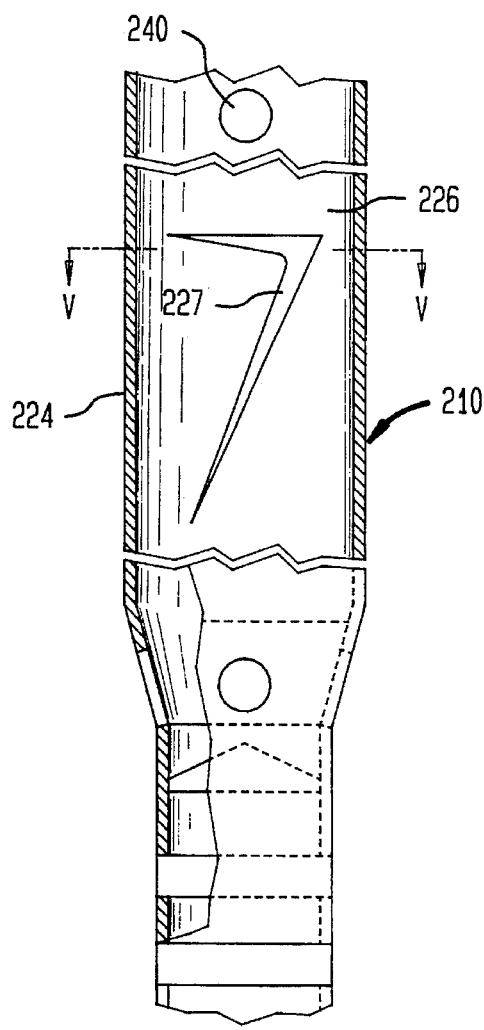
FIG. 4 illustrates a perspective view with parts broken away of another embodiment of a coolant vent duct of the present invention.
Figure 5:
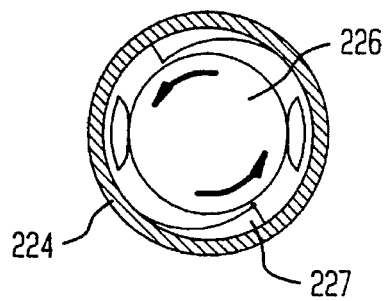
FIG. 5 illustrates a cross-sectional view of the coolant vent duct of FIG. 4 taken along lines V—V of FIG. 4.

Referring now to FIGS. 4 and 5, a further embodiment of a coolant vent duct 210 of the present invention is illustrated. In this embodiment, within an enclosed interior 226 defined by an extension tube 224, a structure 227 is located for separating water droplets from steam in the two phase mixture. Once separated, at least a portion of the separated water can be transferred to the surface of adjacent fuel rods increasing the critical heat flux (CHF) capability. To this end, openings 240 are provided along the length of the extension tube 224 to facilitate the transfer of the water that is separated to adjacent fuel rods.

The structure 227 for separating the water from the steam can be, as illustrated in FIG. 5, a device for imparting centrifugal force to the two phase mixture. In the embodiment illustrated in FIG. 5, the device includes a louver 227 that is formed into the wall of the extension tube.

Figure 6:
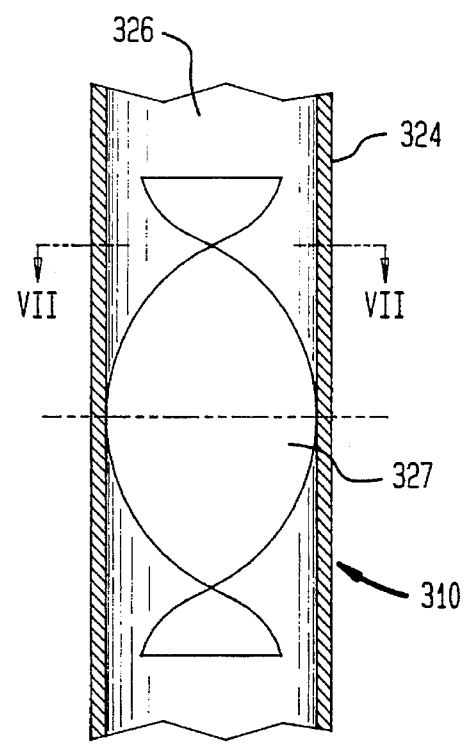
FIG. 6 illustrates a cross-sectional elevation view of another embodiment of a coolant vent duct of the present invention.
Figure 7:
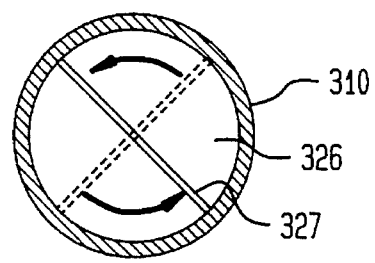
FIG. 7 illustrates a cross-sectional view of the coolant vent duct of FIG. 6 taken along lines VII—VII of FIG. 6.

Referring now to FIGS. 6 and 7, a further embodiment of the coolant vent fuel rod 310 is illustrated. In this embodiment, a structure 327 for separating steam from liquid is a twisted ribbon 327 located within an interior 326 defined by an extension tube 324. As in FIG. 4, separated water exits through one or more vent holes facilitating its transfer to adjacent fuel rods.

In addition to the internal devices for imparting centrifugal force illustrated in FIGS. 4–7, other devices and surfaces for causing agglomeration of water droplets can be used. For example, a spacer can be used. Surfaces that cause a rapid change in direction or configurations can also facilitate separation through gravity, surface tension, and other natural forces.

Referring now to FIGS. 8 and 9, there is another embodiment of the coolant vent duct. In this embodiment a connector/transition piece 414 is provided having a central flared section 415. A part length fuel rod 412 mounts axially thereon a coolant vent duct 416. Inlet holes 427 are located at the bottom end of the extension tube 416. The connector/transition piece 414 provides separation of the liquid water and steam. A liquid film 462 is shown moving up the part length rod 412 surface and onto the surface of the connector/transition piece 414. Once on the transition piece 414, this film is brought in inward direction 464 by a reduction in transition piece diameter 464a and then is rapidly redirected in radially outward direction 465. A sharp break 466 in the surface contour causes the film to separate and to continue to flow in a radially outwards direction as a thin sheet of liquid water 468. The liquid sheet of water 468 and approaching liquid drops 470 collide and outwards radial momentum is imparted to the liquid drops such that downstream of the separator device, liquid 481 is moving radially outwards while steam vapor 482 is moving inward towards the inlet holes 427. Above the outwardly flared section 415 of the transition piece 414 the diameter is again reduced 474 so that a naturally forming eddy flow 476 behind the separating sheet of liquid 468 intersects the separating sheet 468 in a more parallel fashion as opposed to a more perpendicular fashion, at the film separation point, the break 466. A second flared portion 478 of the transition connector piece 414 repeats the process for any residual liquid. If the initial flared portion 415 is not present, the second flared portion 478 becomes the primary means of directing liquid outward and away from the inlet holes 427.

The initial diameter reduction 464a at the bottom end of the transition connector piece is done smoothly so that the liquid film remains attached to the surface until it reaches the intended separation point, the break 466. The diameter is reduced ahead of the flared section so that the flared section presents a greater frontal area to the main flow stream and therefore has a greater interaction with it. The flared surfaces are rounded or curved as opposed to being straight conical or tapered surfaces so as not to impede the flowing film by trapping it in any sharp concave corners, upstream of the intended separation point 466. As shown in FIG. 9, the transition connector piece is a surface of revolution about a vertical axis down the vents. While this is easy to fabricate, sections other than round sections, for example square sections, would likely function in a satisfactory manner. Also the flared section might be sectioned into several pieces that are displaced axially from one another.

In the embodiments shown in FIGS. 8 and 9, connector/transition piece 414 which functions to separate liquid water and steam is mounted at one end to a part length fuel rod 412 and at its other end is connected to the coolant vent duct 416. As contrasted to functioning, in part, as a mechanical connection between the part length fuel rod and the coolant vent duct, the connector/transition piece can instead serve as an upper end cap of the part length fuel rod.

Figure 22:
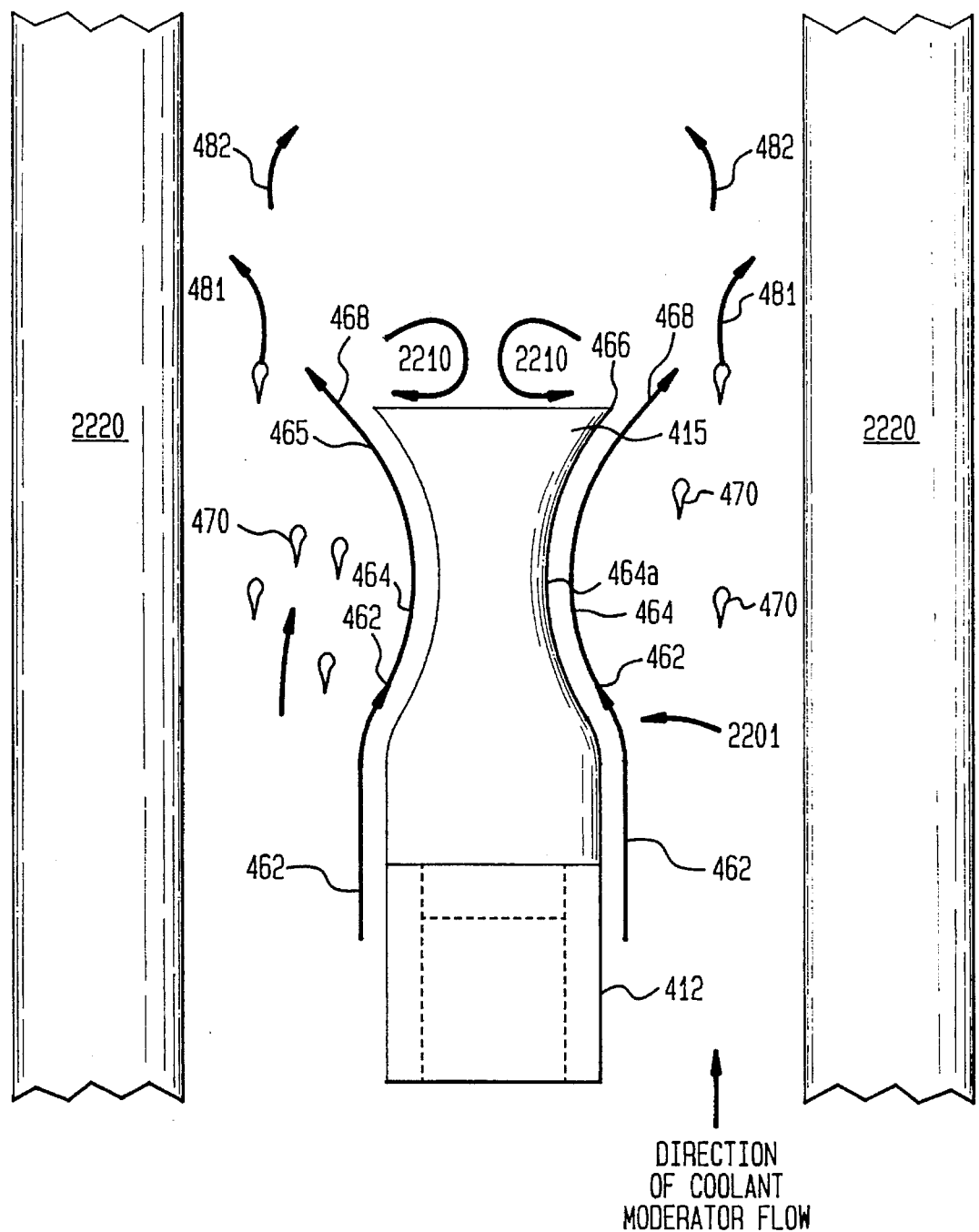
FIG. 22 illustrates an enlarged perspective view of a reflex upper end fitting connected to a part length fuel rod.

In a further embodiment of the present invention, a reflex upper end cap or fitting 2201, is connected to the part length fuel rod and is shown in FIG. 22. The reflex upper end fitting is shown connected to a part length fuel rod without using either a connector/transition piece and/or a coolant vent duct. The reflex upper end fitting has a flared section which is truncated at a sharp break. As coolant/moderator flows through the fuel assembly and along the part length fuel rod, a liquid film is formed on the surface of the part length fuel rod. The liquid film moves up the part length fuel rod and onto the reflex upper end fitting and is then directed towards surrounding fuel rods. In the case of light water reactors, upwards flowing liquid water drops in the two phase flow collide with the continuous liquid film sheet as it is moving towards the surrounding fuel rods and is imparted with an outwards radial momentum, and together with the liquid film sheet impinge upon the surrounding fuel rods. The reflex upper end fitting thus increases the amount of liquid coolant/moderator on and near the surface of the surrounding fuel rods while steam vapor flows into the large open subchannel above the top of the part length fuel rod.

Reflex upper end fitting 2201 shown in FIG. 22 is the portion of connector/transition 414 shown in FIG. 9 from and including sharp break 466 upstream to the part length fuel rod 412. FIG. 22 shows reflex upper end fitting 2201 in which corresponding elements in each of FIGS. 9 and 22 have the same reference numbers. Reflex upper end fitting 2201 is connected to part length fuel rod 412 and in the present embodiment is shown without a coolant vent duct.

As shown in FIG. 22, a single flared section 415 is truncated at sharp break 466 and liquid film 462 is shown moving up the surface of part length fuel rod 412 onto the surface of the reflex upper end cap 2201. Once on the reflex upper end cap, liquid film 462 is brought in inward direction 464 by a reduction in diameter 464a and then is rapidly redirected in radially outward direction 465. Sharp break 466 in the surface contour causes liquid film 462 to separate from the reflex upper end fitting 2201 and to continue to flow in a radially outwards direction towards the surrounding subchannels and fuel rods as a thin sheet of liquid water 468. Liquid sheet of water 468 and approaching liquid drops 470 collide in the flow stream and outwards radial momentum is imparted to liquid drops 470 such that downstream of the reflex upper end fitting 2201, liquid 481 is moving radially outwards towards the surrounding fuel rods 2220 and surrounding subchannels while steam vapor 482 concentrates in the large open subchannel above the reflex upper end fitting. After impact with water drops, sheet 468 is no longer continuous and begins to break up thereby enabling vapor to pass through it to the large open subchannel above the reflex upper end fitting.

Eddy flow 2210 is formed behind sheet 468 and intersects the sheet 468 in a parallel fashion at sharp break 466. The movement of liquid onto and around the surrounding fuel rods 2220, and the concentration of vapor in the large open subchannel above the part length fuel rod and away from surfaces of the surrounding fuel rods, results in an enthalpy reduction for the flow on and near the surface of the surrounding fuel rods.

In order to facilitate the insertion and/or removal of a part length fuel rod having a reflex upper end fitting into a fuel assembly as well as to facilitate fuel assembly fabrication, it may be desirable that the maximum outside diameter of the reflex upper end fitting not exceed that of the part length fuel rod to which it is connected. As discussed previously, in order for liquid film 462 which flows upwards on the surface of part length fuel rod 412 to separate from the surface of the end fitting as a thin continuous sheet, the reflex upper end fitting has an outwardly flared section 415 which ends in sharp break 466. In order to both facilitate fuel rod loading into a fuel assembly as well as to have the liquid film separate as a thin continuous sheet from the surface of the end fitting, the shape of the reflex upper end fitting includes a reduction in diameter 464a, upstream of outwardly flared section 415 and sharp break 466.

As a practical matter, with respect to the embodiments illustrated in FIGS. 1–3, 8 and 9, the separation of steam from water at the coolant vent duct inlet openings may be less than 100%, i.e., 100% steam may not be flowing into the interior of the coolant vent duct. Therefore, if desirable, the concepts illustrated in FIGS. 1–3, 8 and 9 and 4–7 can be combined. Accordingly, even though liquid diversion means are located on an outer wall of the extension tube, additional flow separation means can be enclosed inside the coolant vent ducts as set forth in the embodiments illustrated in FIGS. 4–7.

Further embodiments of connector/transition pieces are shown in FIGS. 10–15. These embodiments can be used alone to mount beneath a coolant vent duct or can be used such as shown in FIG. 8 to mount a coolant vent duct 416 to a part length fuel rod 12. All these embodiments can be used to mount a coolant vent duct 416 to a water rod or a water/fuel rod or the like.

FIG. 10 shows a transition/connector 500 having a hollow perforated tube portion 504 mounted axially above a substantially solid connector portion 506. The hollow tube portion 504 can be fashioned having a top socket portion 510 which interfits inside the coolant vent duct 416. The socket portion 510 has a top open end 512. The connector section 506 has a bottom socket portion 516 for mechanical insertion and connection to a rod therebelow. The transition section 506 has a taper 520 in upward direction, an elongate neck portion 522 terminating in a sharp expansion 524 with a sharp break 526 at the intersection with the hollow tube portion 504. The connector 506 would behave similarly as the lower one half of the connector 414 as shown in FIG. 9.

FIG. 10 shows the hollow tube portion 504 having a plurality of holes 530 thereinto. The holes 530 can merely be openings around a circumference of the cylindrical tube wall. Optionally, the holes can have a cylindrical protruding rim 534 or a beveled protruding rim 536. These protruding rims 534, 536 or variations thereof could be applied to any of the embodiments if desired.

The transition connector 600 shown in FIG. 11 is substantially the same as the transition connector 500 shown in FIG. 10 except that a helical fin is attached to and wound around a connector section 604. The connector section 604 provides a first taper 608, a neck section 610 and a sharp expansion 612 terminating in a sharp break 614 at an intersection between the connector section 604 and a hollow perforate tubular section 620 thereabove. The transition/connector 600 provides a open top socket 622 similar to the socket 510 in FIG. 10. A bottom socket portion 626 can be provided for connection to a rod below.

Figure 12:
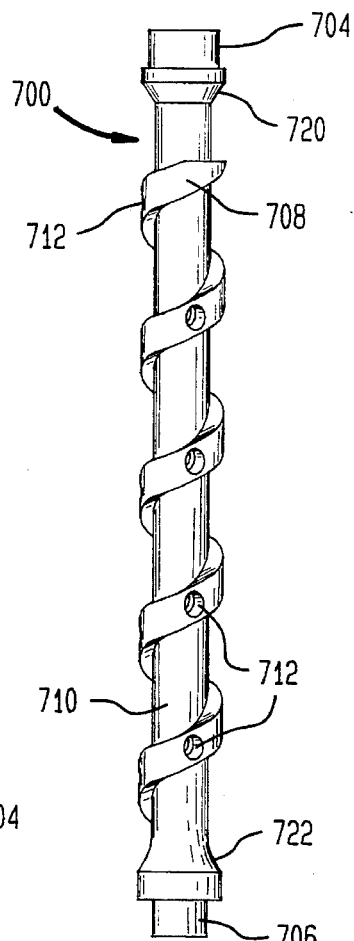
FIG. 12 illustrates a perspective view of a further embodiment of the transition/connector piece of the present invention.

Another embodiment of the transition/connector is shown as transition/connector 700 in FIG. 12. This embodiment is similar to FIGS. 10 and 11 and can provide an open top socket 704 at a top end thereof and a mechanical connection socket 706 at a bottom end thereof. The transition connector is substantially hollow. A helical pad 708 is formed or wrapped around an elongate neck 710 of the transition/connector 700. Arranged along the helical pad 708 are openings 712. The elongate neck section 710 terminates at an upper end in a sharp expansion 720 and at a lower end in a taper 722. The opening 712 communicate into the hollow neck section 710 where steam vapor can be carried upward through the elongate neck section 710 and out of the open top socket 704 into a coolant vent duct 416 arranged thereabove (not shown).

Figure 13:
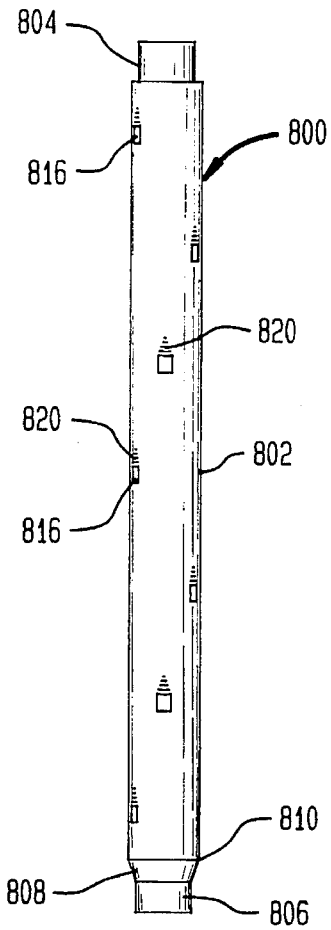
FIG. 13 illustrates a perspective view of a further embodiment of the transition/connector piece of the present invention.

Another embodiment of a transition/connector 800 is shown in FIG. 13. In this embodiment a substantially hollow neck section 802 has an open top socket portion 804 for interfitting into a coolant vent duct 416 thereabove (not shown). A bottom socket 806 is provided for mechanical interconnection with a rod below. Adjacent the socket 806 is a sharp expansion 808 and a sharp break 810 into the hollow neck section 802. A plurality of openings 816, in this embodiment shown as square, are provided. Above each opening is a cone-shaped depression 820 which tapers down in upward direction to the surface of the elongate neck section 802.

Figure 14:
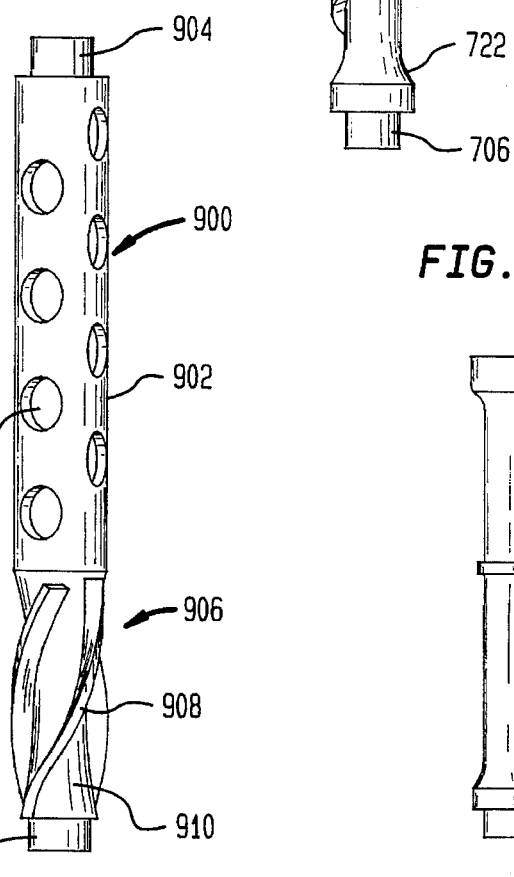
FIG. 14 illustrates a perspective view of a further embodiment of the transition/connector piece of the present invention.

Another embodiment of a transition/connector 900 is shown in FIG. 14. In this embodiment, a perforated hollow tube section 902 having a top socket with an open top 904 thereabove is mounted axially above a connecting portion 906 having a plurality of helical veins 908 arranged protruding from a tapered neck section 910. The tapered neck section tapers inwardly from its bottom to a central area and outwardly thereafter up into hollow tube portion 902. An attachment socket 914 is provided below the neck section 910. The hollow tube portion 902 is provided with openings 920 for inlet of steam to progress upwardly inside the tube portion 902, out of the top socket 904 into a coolant vent duct 416 mounted thereabove (not shown).

Figure 15:
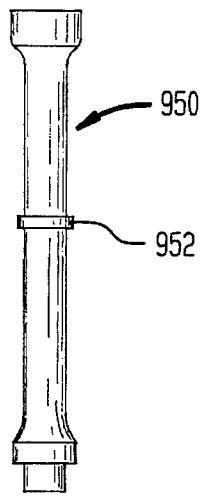
FIG. 15 illustrates a perspective view of a further embodiment of the transition/connector piece of the present invention.

Another embodiment of a connection portion 950 is shown in FIG. 15. In this embodiment, the connector 414 of FIG. 9 is elongated and means for separating the upwards flowing liquid surface film is a ridge 952.

The embodiments for the connector/transition pieces shown in FIGS. 10–15 could also be used in combination with the embodiments of FIGS. 4–7, thus providing liquid diversion means on both an outside and on an inside of the transition/connection piece or the coolant vent duct.

The present inventive coolant vent duct need not be associated with a part-length fuel rod. It could be used in conjunction with a water rod or some combination of water and fuel elements. A bundle containing one or more coolant vent ducts can use these ducts in conjunction with water rods, water channels, and the like. The inlet elevation of the coolant vent duct can be at any elevation along the active length of the bundle where there is available steam to be separated from liquid coolant. A coolant vent duct bundle can contain one or more individual coolant vent ducts whose design need not all be identical. For example, each coolant vent duct in the bundle might have a different inlet elevation. The shape of inlet and outlet openings can be various. Examples of inlets are round holes, rectangular holes, or openings of some other regular or irregular shape. The surface of the duct can be distorted in the vicinity of the inlets to enhance separation of steam from liquid, or to reduce pressure drops.

As previously stated, the coolant vent duct reduces the enthalpy rise maldistribution by providing active flow subchannels outside of and adjacent to the coolant vent duct that are much smaller than in the case of a part length fuel rod without a duct.

In accordance with another aspect of the present invention, a predetermined amount of axially distributed hydraulic resistance is inserted and positioned above the part length fuel rod. In a further embodiment of the present invention, a hydraulic resistance strip having such predetermined amount of an axially distributed hydraulic resistance surface is positioned above the part length fuel rod of a fuel assembly to achieve a more uniform distribution of hydraulic resistance within the fuel assembly in order to limit cross-flow from and between adjacent subchannels while maintaining most of the increase in fuel assembly flow area that is associated with the open space above the part length fuel rod. Although the cross-sectional area of the axially distributed hydraulic resistance surface of the hydraulic resistance strip is finite, it does not significantly decrease the flow area above the part length fuel rod, thereby maintaining the objective of increasing the water to fuel ratio in the upper part of the core.

The shape and the surface area of the hydraulic resistance strip is selectively chosen to achieve a particular hydraulic resistance and thus, for example, to approximate the hydraulic resistance of the portion of the fuel rod removed to form the part length fuel rod. In addition, the length of the hydraulic resistance strip may be chosen depending upon desired hydraulic resistance characteristics. The hydraulic resistance strip may be positioned at any elevation in the fuel assembly and most importantly at those elevations which are upstream of those elevations at which critical heat flux (CHF) can first occur. The elevation at which CHF first occurs is below the top of the active fuel and usually just upstream of the uppermost spacer. Ideally, the ratio of the surface area to the cross-sectional area or volume of the hydraulic strip should be maximized in order to achieve the desired hydraulic resistance with the smallest decrease of flow area.

The hydraulic resistance added by the hydraulic resistance strip is frictional resistance which is the same type of hydraulic resistance as is produced by the wetted surface of the fuel rods. The amount of hydraulic resistance offered by the hydraulic resistance strip is proportional to the wetted perimeter of the hydraulic resistance strip at each axial elevation.

Part length fuel rods have been used in BWR's to achieve a better axial proportioning of moderator and fuel as compared to fuel assemblies having only full length fuel rods and can achieve reduced pressure drop. Above each part length fuel rod is a subchannel with reduced hydraulic resistance resulting, in part, from the absence of the cross-sectional area of the part length fuel rod. The space that would have been occupied by the part length fuel rod plus the four flow subchannels that surround the location of the part length fuel rod form one large open space or subchannel above the part length fuel rod. The large subchannel is larger than the other coolant flow subchannels formed by full length fuel rods. Increased mass flux occurs in the large subchannel and as a result, reduced mass flux occurs in the surrounding subchannels. Cross-flows into and out of the large subchannel occur especially at (a) the beginning of the large subchannel immediately above the top of the part length fuel rod as well as at (b) spacer locations above the part length fuel rods. Such cross-flows can deplete liquid film from the adjacent and surrounding full length fuel rods. Heat transfer, and more particularly burnout performance can be adversely affected by such cross-flows.

Figure 16:
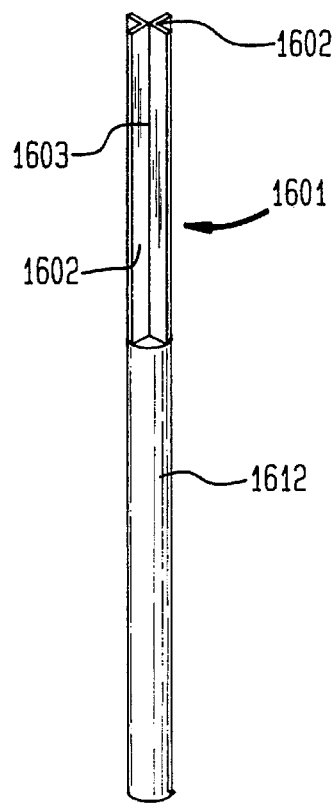
FIG. 16 illustrates a perspective view of a hydraulic resistance strip positionsed on the top of a part length fuel rod.
Figure 17A:
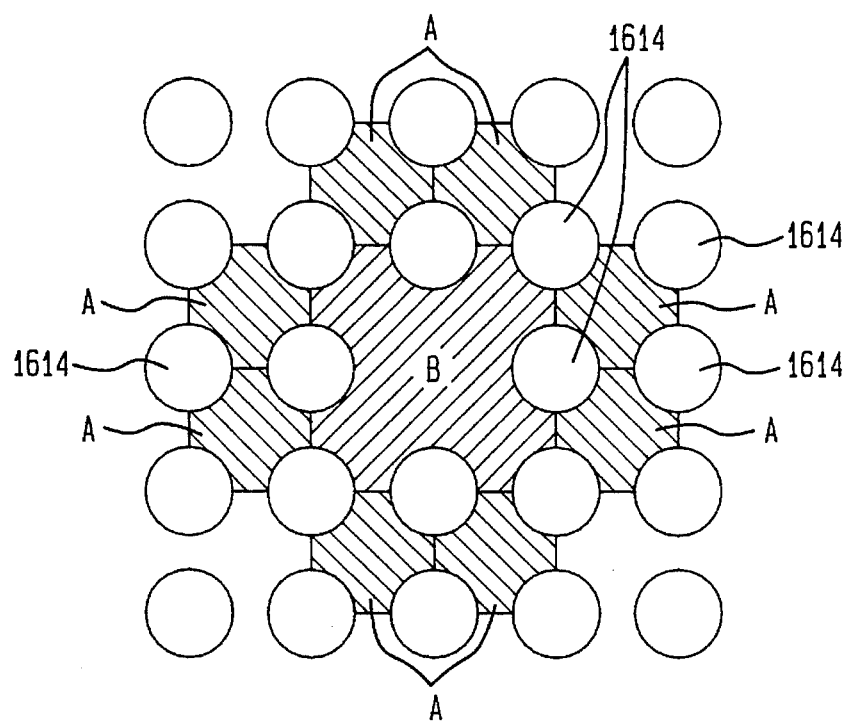
FIG. 17a illustrates a cross-sectional view looking up at an inner portion of a fuel assembly and showing several fuel rods and subchannels.

FIG. 16 is a perspective view showing a hydraulic resistance strip 1601 positioned on the top of a part length fuel rod 1612. FIG. 17a is a cross-sectional view looking up at an inner portion of a part of a fuel assembly having a part length fuel rod in the lower portion of the fuel assembly without a hydraulic resistance strip and showing twenty-four of the full length fuel rods 1614. The part length fuel rod which is positioned in this example in the lower portion of the assembly cannot be seen in this view. Part length fuel rod(s) usually extend from the bottom of the fuel assembly to a point typically ½ to ¾ of the length of the assembly, but can be of any length and positioned anywhere along the height of the fuel assembly. Unless positioned at the very top of the fuel assembly, above the part length fuel rod is the large subchannel with reduced hydraulic resistance. The reduced hydraulic resistance results from the absence of the cross-sectional area, wetted surface area, and heat source of the part length fuel rod.

Figure 17B:
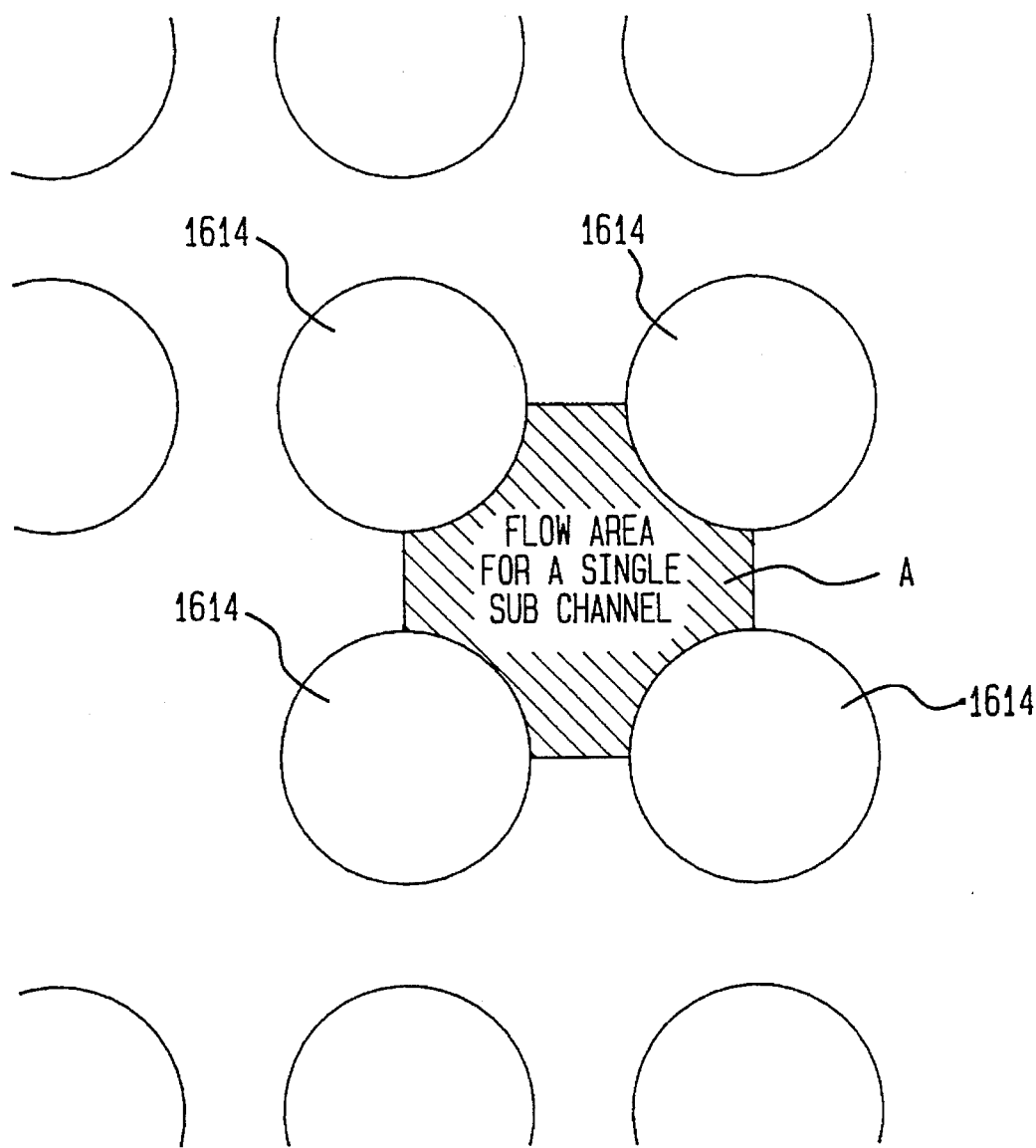
Figure 17C:
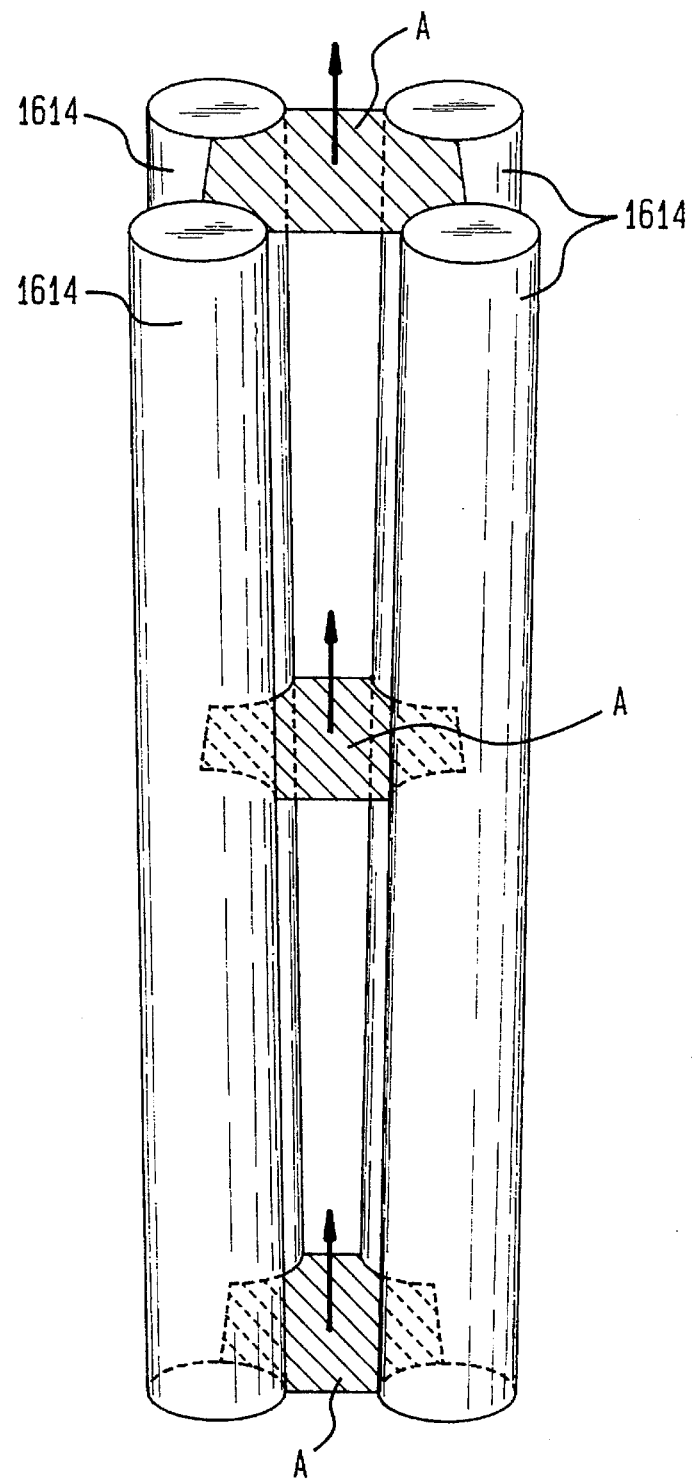
FIG. 17c illustrates a perspective view along the axial height of the fuel assembly of the portion of the fuel rod array of FIG. 17b.

Four adjacent full length fuel rods 1614 shown in the fuel rod array in FIG. 17a is shown in FIG. 17b. The subchannel between the fuel rods 1614 having cross-sectional area A is the flow area up through the fuel assemblies for a single subchannel. FIG. 17c is a perspective view of the portion of the fuel rod array of FIG. 17b showing the single subchannel extending along the axial height of the fuel assembly. Typically, each fuel rod in conjunction with adjacent fuel rods form subchannels having a cross-sectional area A which are referred to as subchannel flow areas. The total flow area in the large subchannel above the part length fuel rod in the array shown in FIG. 17a is the four subchannel flow areas A that would have existed had a full length instead of a part length fuel rod been used plus the cross-sectional area of the part length fuel rod. The total flow area for this large subchannel is designated in FIG. 17a as B. In the array shown in FIGS. 17a, 17b, and 17c, as is typical of most fuel assemblies, coolant flows up from the bottom and generally within each subchannel along the axial height of the fuel assembly.

The elimination of heat source, the increase in cross-sectional flow area, and the loss of wetted surface area due to the use of a part length fuel rod leads to an increase of coolant flow and mass flux into the large subchannel from other surrounding subchannels. Thus, at the start of the open flow region which begins immediately above the top of the part length fuel rod, increased cross-flows occur from the other surrounding subchannels. In the array shown in FIG. 17a, cross-flows into the large subchannel occur from the eight subchannels which interface with the large subchannel. Such cross-flows not only increase the flow in the large subchannel above the part length fuel rod, but concomitantly decrease the coolant flow and mass flux within the surrounding subchannels.

In accordance with the present invention, hydraulic resistance strip 1601 adds hydraulic resistance into the large subchannel above the part length fuel rod to decrease the flow from adjacent subchannels which would otherwise be drawn into the subchannel due to its low hydraulic resistance. Therefore, by causing the decrease of undesirable cross-flows from adjacent subchannels, more flow remains available within those adjacent subchannels thereby improving critical heat flux (CHF) of the fuel assembly. The hydraulic resistance from the insertion and positioning of a hydraulic resistance strip within the subchannel above the part length fuel rod achieves uniform or selectively variable hydraulic resistance, axially as well as radially, across the fuel assembly.

Critical heat flux (CHF) performance is improved by using a hydraulic resistance strip having a resistance which limits the flow rate in the large subchannel above the part length fuel rod so that it is in the same proportion to subchannel power as occurs in subchannels that are not formed by a part length fuel rod. Although the addition of hydraulic resistance in the subchannel above the part length fuel rod improves the critical heat flux performance of the fuel assembly, an associated consequence is an increase in the pressure drop of the fuel assembly. If the increase in pressure drop is undesirable or unacceptable, it can be offset for example by a small reduction of approximately 1 to 2% in the diameter of the fuel rods.

Figure 18:
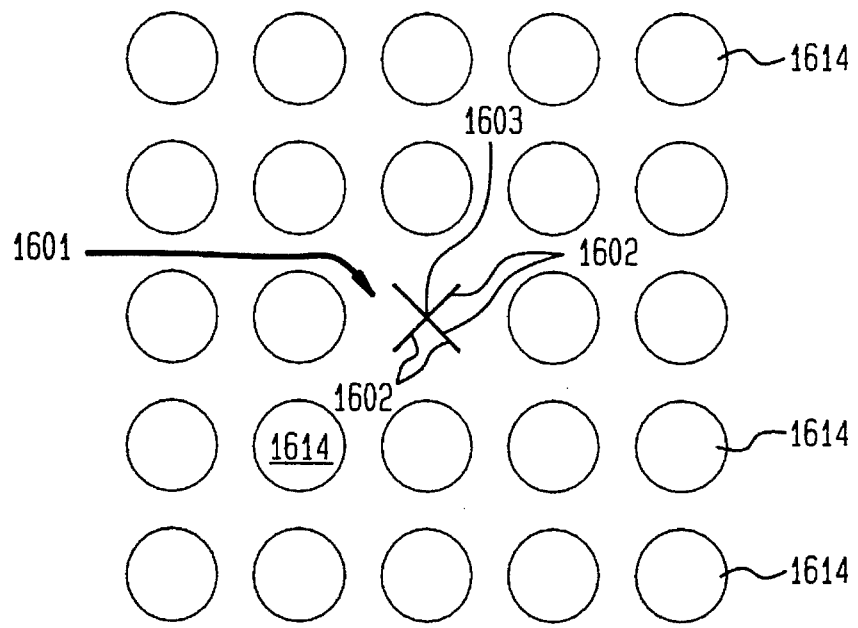
FIG. 18 illustrates a cross-sectional view of the inner portion of the fuel assembly shown in FIG. 17a showing a cruciformed shaped hydraulic resistance strip and several fuel rods.

The hydraulic resistance strip 1601 shown connected to the top of the part length fuel rod 1612 in FIG. 16 has walls 1602 extending from body 1603 which are arranged to form a cruciform cross-sectional area. FIG. 18 is a cross-sectional view of the inner portion of a fuel assembly shown in FIG. 17a but with the cruciform cross-sectional area hydraulic resistance strip 1601 secured to the top of a part length fuel rod. FIG. 18 shows hydraulic resistance strip 1601 positioned so that walls 1602 are parallel to the fuel rods, and are so positioned to be diagonal to the rows and columns of the fuel rods. The hydraulic resistance strip can be rotated or oriented so that walls 1602 are either parallel to or at any other angle to the rows and columns of the rod array.

Figure 19A:
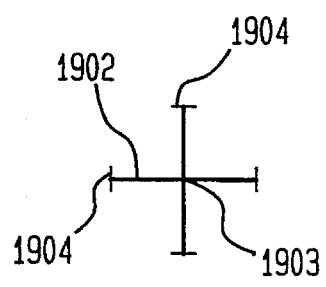
FIGS. 19a, 19b, and 19c are cross-sectional views of three alternative configurations of the hydraulic resistance strip.
Figure 19B:
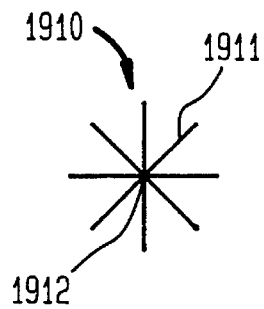
Figure 19C:
Figure 20:
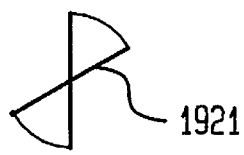
FIG. 20 illustrates a cross-sectional view of the resistance strip in FIG. 19c which has been rotated to form a twisted ribbon.

The hydraulic resistance strip can have either constant or variable cross-sectional areas along its length. In addition to that shown in FIG. 16, examples of a single constant cross-sectional area are a cruciform with walls 1902, body 1903 and end plates 1904 (FIG. 19a), a star 1910 with walls 1911 and body 1912 (FIG. 19b), and a flat strip 1920 (FIG. 19c). The hydraulic resistance strip can have a cross-sectional area of a flat strip (FIG. 19c) which can be rotated to form a twisted ribbon (FIG. 20). Similarly, a hydraulic resistance strip having the cross-sectional areas shown in FIGS. 16, 19a, and 19b can each be rotated about its central axis to further increase its hydraulic resistance. For example, by twisting strip 1601 shown in FIG. 16, four helical vanes are formed on its surface. One or more of the inside corners of the configurations of hydraulic resistance strips shown in FIGS. 19a and 19b can have concave shapes 1905, 1915 respectively, as shown in FIGS. 19aa and 19bb. Such concave shapes will support greater thickness of liquid film thereby increasing the water to fuel ratio of the fuel assembly.

Figure 19D:
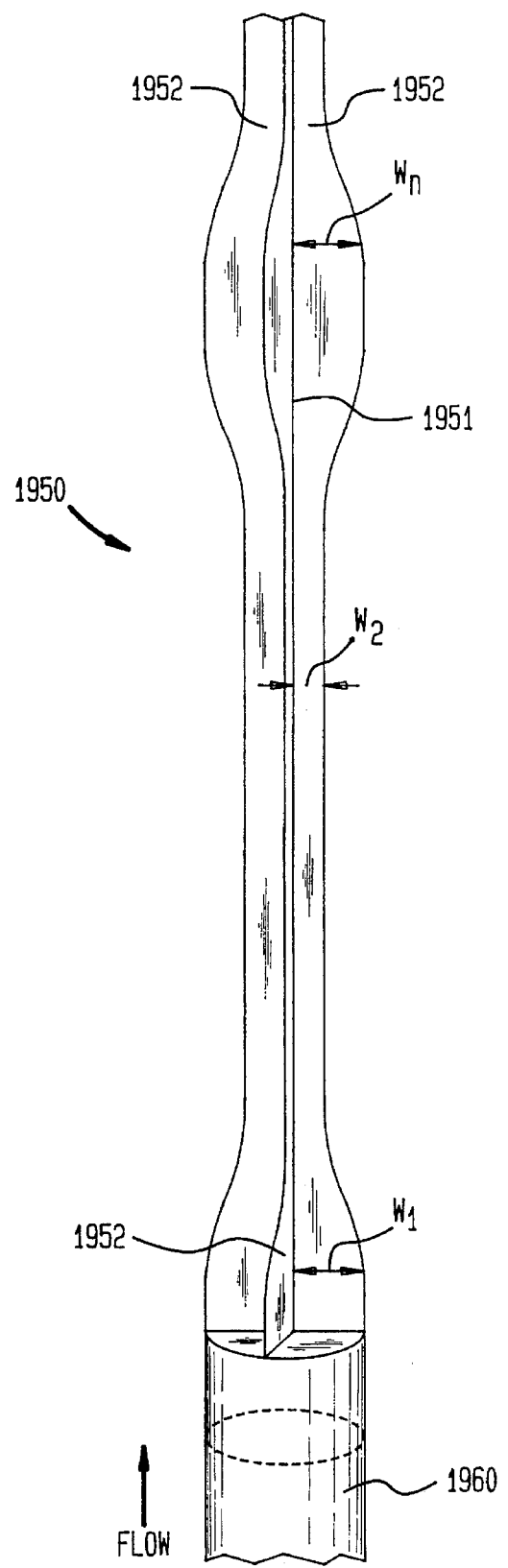
FIG. 19d illustrates a hydraulic resistance strip having variable cross-sectional areas.
Figure 19A:
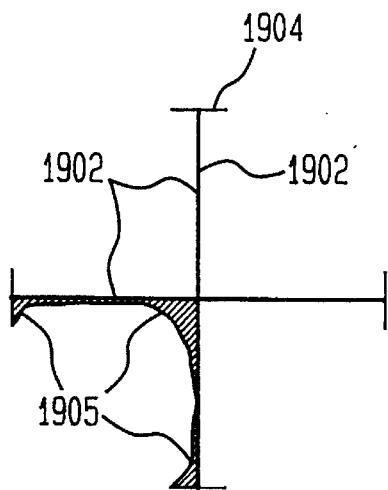
Figure 19B:
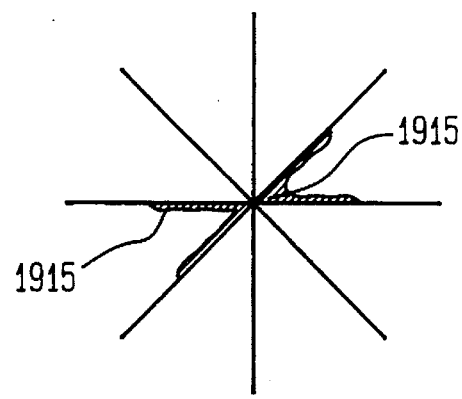

In accordance with another aspect of the present invention, the hydraulic resistance strip can have a variable cross-sectional area to further enable selective positioning of either greater or lesser amounts of hydraulic resistance axially within the subchannel above the part length fuel rod. An example of such a hydraulic resistance strip is shown in FIG. 19d. Hydraulic resistance strip 1950 has body 1951 and walls 1952 with variable widths $W_1$, $W_2$, and $W_n$ positioned above part length fuel rod 1960. Immediately downstream of part length fuel rod 1960, width $W_1$ of walls 1952 is selected so that the hydraulic resistance of hydraulic resistance strip 1950 limits peak cross-flow velocities. Narrower width $W_2$ of walls 1952 is selected to provide lower hydraulic resistance. Such lower hydraulic resistance is typically positioned along the axial height of hydraulic resistance strip 1950 which corresponds to the position(s) between spacers of the fuel assembly. Width $W_n$ is selected to have high hydraulic resistance and is positioned along the axial length of the hydraulic resistance strip 1950 to correspond to the elevation of the spacer or spacers.

The determination of the predetermined amount of axially distributed hydraulic resistance is made in light of a specific configuration of the part length and full length fuel rod array. It is expected that one of ordinary skill in the art would determine the value or amount of hydraulic resistance desired for the particular configuration and then distribute the desired value of hydraulic resistance along the length of the hydraulic strip to achieve the goals and teachings of the invention as set forth above in the manner set forth above.

Figure 21:
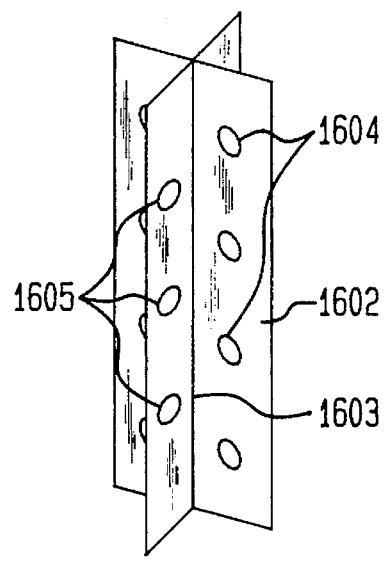
FIG. 21 illustrates a perspective view of a hydraulic resistance strip having apertures and protrusions.

In order to further increase the hydraulic resistance of a hydraulic resistance strip having a particular configuration or cross-sectional area, apertures and/or protrusions can be added to the walls or external surface of the hydraulic resistance strip. As shown in FIG. 21, apertures 1604 and protrusions 1605 are added to walls 1602 of the hydraulic resistance strip. In addition, the surface of the hydraulic resistance strip may also be roughened to increase hydraulic resistance.

In previous embodiments of the present invention, hydraulic resistance is positioned and affixed atop a part length fuel rod, between a part length fuel rod and a coolant vent fuel rod, or to the top of a coolant vent rod.

In a further embodiment of the present invention, hydraulic resistance in the form of a coolant diverter is positioned, as in previous embodiments, in the large subchannel above a part length fuel rod. But, as contrasted to all of the previous embodiments, the hydraulic resistance is not secured or affixed to either the part length fuel rod or the coolant vent fuel rod. By not being so secured, selected axial positioning of hydraulic resistance can be obtained. Such positioning can be used to overcome hydraulic resistance imbalances that occur above a part length fuel rod without necessarily securing either a hydraulic resistance strip, a reflex upper end fitting, or a coolant vent fuel rod, to the part length fuel rod. An additional advantage of not being secured to the part length fuel rod or the coolant vent fuel rod is that the added hydraulic resistance need not extend axially within the large subchannel from the part length fuel rod or coolant vent rod to the particular elevation within the fuel assembly where the added hydraulic resistance is desired.

In the present embodiment, hydraulic resistance is secured in a position within the fuel rod spacer which would have been occupied by the fuel rod if it extended up to the elevation of the spacer. Thus, the coolant diverter is positioned in the fuel rod spacer in the large subchannel formed above the part length fuel rod. The diverter is configured to redirect the liquid portion of the two phase mixture of liquid and vapor that is flowing in the subchannel towards the surrounding fuel rods and adjacent flow subchannels. Although in the preferred embodiment, the coolant diverter(s) is shown positioned in the spacer above one or more of the large subchannels formed by the part length fuel rod, the coolant diverter can be positioned anywhere in the spacer, as well as in an assembly without a part length fuel rod.

As in the embodiments of the reflex upper end fitting, coolant vent rod, and hydraulic resistance strip, in addition to offering increased hydraulic resistance, the coolant diverter also functions to separate liquid from two phase flow. When positioned downstream of a part length fuel rod, the diverter not only provides a means of diverting liquid, but also provides hydraulic resistance that reduces excessive flow velocities in the subchannel above the part length fuel rod and crossflows between the subchannel above the part length fuel rod and adjacent subchannels, particularly at spacer elevations.

The coolant diverter has a flared section which is truncated at a sharp break. As coolant/moderator flows through the fuel assembly and the spacer, a liquid film is formed on the surface of the diverter stem. The liquid film moves up the diverter stem and onto the flared section where it is then directed towards surrounding fuel rods. In the case of light water reactors, upwards flowing liquid water drops in the two phase flow collide with the continuous liquid film sheet as it is moving towards the surrounding fuel rods and is imparted with an outwards radial momentum, and together with the liquid film sheet impinge upon the surrounding fuel rods. The coolant diverter thus increases the amount of liquid coolant/moderator on and near the surface of the surrounding fuel rods while steam vapor flows into the large open subchannel above the coolant diverter.

Figure 23:
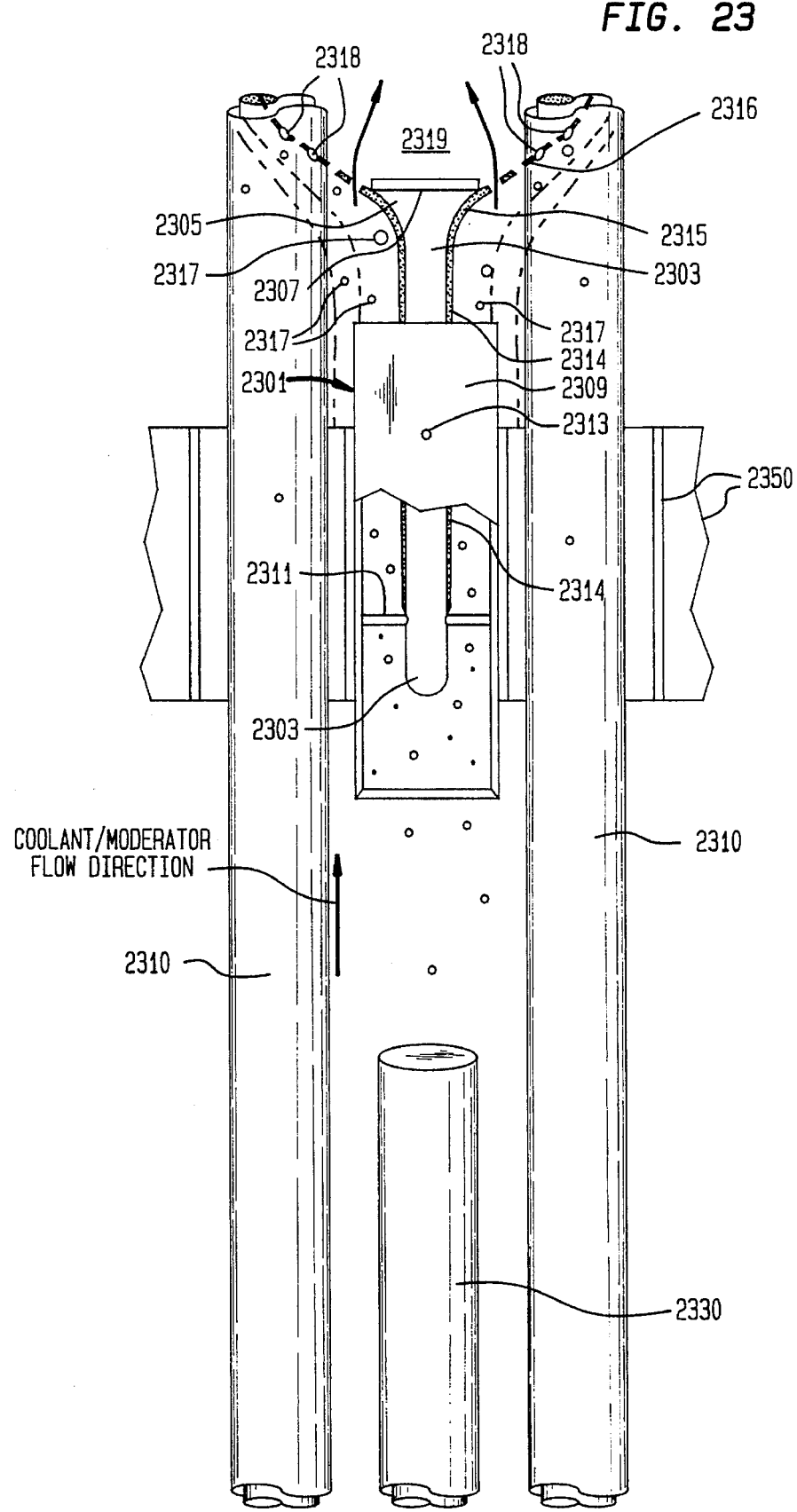
FIG. 23 illustrates a side perspective view of a coolant diverter positioned within a nuclear fuel rod spacer of a fuel rod assembly.

As shown in FIG. 23, coolant diverter 2301 is positioned and secured within spacer 2350 and between fuel rods 2310 and above part length fuel rod 2330. Diverter stem 2303 has a flared section 2305 which is truncated by a sharp break 2307. Diverter tube 2309 serves to channel flow along diverter stem 2303 while adding hydraulic resistance. It also serves as a structure to which stem 2303 is attached. Although stem 2303 is shown in FIG. 23 secured to tube 2309, stem 2303 can also be secured to spacer 2350 without using tube 2309. FIG. 23 shows pins 2311, 2313 securing diverter stem 2303 within diverter tube 2309. Flared section 2305 and sharp break 2307 extend beyond the downstream edge of diverter tube 2309. Diverter tube 2309 is secured to spacer 2350 by a permanent bond such as by welding. It may be desirable to removably secure tube 2309 to the spacer to allow removal for access to a part length fuel rod. Such non-permanent securing includes configuring tube 2309 to lock into place in an opening in the spacer.

The single flared section 2305 is truncated at sharp break 2307 and liquid film is shown on the surface of stem 2303. Because of flared section 2305, liquid film 2314 which is moving up the surface of stem 2303 is directed in a radially outward direction. Sharp break 2307 in the surface contour causes liquid film 2315 on flared section 2305 to be separated from the flared section and then to continue to flow in a radially outward direction towards the surrounding subchannels and fuel rods as a thin sheet of liquid water 2316. Liquid sheet of water 2316 and approaching liquid water drops 2317 collide in the flow stream and outwards radial momentum is imparted to the liquid drops such that downstream of the coolant diverter, sheet of liquid water 2316 and water drops 2318 (imparted with outward radial momentum) move radially outwards towards the surrounding fuel rods 2310 and surrounding subchannels while steam vapor 2319 concentrates in the large open subchannel above the coolant diverter. After impact with water drops, sheet 2316 is not longer continuous and begins to break up thereby enabling vapor to pass through it to the large open subchannel above the coolant diverter.

Coolant diverter 2301 shown in FIG. 23 has the same configuration as reflex upper end fitting 2201 shown in FIG. 22 as well as the same configuration of a portion of connector/transition 414 shown in FIG. 9. However, coolant diverter has a diverter stem that does not have a diameter reduction as does the reflex upper end fitting (FIG. 22) and the connector/transition (FIG. 9).

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A coolant diverter for a nuclear reactor fuel assembly having a plurality of substantially parallel elongated fuel rods and a spacer for positioning and laterally restraining the fuel rods, the coolant diverter for diverting at least a portion of liquid coolant in a two phase coolant flow onto adjacent fuel rods, the coolant diverter comprising:

a stem portion;

a flared diverter portion being integrally formed with said stem portion so as to have a smooth, continuous trumpet-like outer surface, said diverter portion terminating in a sharp break end portion;

means for mounting said coolant diverter within the spacer, wherein said means for mounting includes a diverter tube, said stem portion being disposed within said diverter tube, said diverter tube also for guiding said two phase coolant flow along said coolant diverter.

2. The coolant diverter of claim 1 wherein said stem portion is an elongated portion having a first diameter and said end portion has a second diameter greater than said first diameter.

3. A nuclear fuel reactor fuel assembly comprising;

a plurality of elongated full length fuel rods;

means for supporting said fuel rods in spaced, substantially parallel relation, said supporting means including a spacer for said rods;

a coolant diverter for diverting at least a portion of liquid coolant in a two phase coolant flow onto adjacent fuel rods, the diverter having an elongated stem portion and a flared diverter portion being integrally formed with said stem portion so as to have a smooth, continuous trumpet-like outer surface, the flared diverter portion terminating in a sharp break end portion;

means for mounting said coolant diverter in the spacer, wherein said mounting means includes a diverter tube for mounting the stem portion of said coolant diverter and for guiding the two phase coolant flow along said coolant diverter.

4. The nuclear fuel assembly of claim 3 wherein said fuel assembly includes a part length fuel rod and wherein said coolant diverter is positioned downstream of said part length fuel rod.

5. The nuclear fuel assembly of claim 3 wherein said coolant diverter is positioned in the spacer between adjacent fuel rods.

6. In a nuclear reactor fuel assembly having plurality of elongated, substantially parallel fuel rods including at least one part length fuel rod and a fuel rod spacer, the improvement comprising:

a coolant diverter for diverting at least a portion of liquid coolant in a two phase coolant flow onto adjacent fuel rods, the coolant diverter including a stem portion and a flared diverter portion integrally formed with said stem portion so as to have a smooth, continuous trumpet-like outer surface; the flared diverter portion terminating in a sharp break end portion;

means for mounting said coolant diverter in said fuel rod spacer downstream of said part length fuel rod, wherein said mounting means includes a diverter tube for mounting said coolant diverter and for guiding the two phase coolant flow along said coolant diverter; said stem portion being fixedly arranged within said diverter tube.

7. In a nuclear reactor fuel assembly having plurality of elongated, substantially parallel fuel rods, and a fuel rod spacer, the improvement comprising:

a coolant diverter for diverting at least a portion of liquid coolant in a two phase coolant flow onto adjacent fuel rods, the coolant diverter including a stem portion and a flared diverter portion integrally formed with said stem portion so as to have a smooth, continuous trumpet-like outer surface; the flared diverter portion terminating in a sharp break end portion;

means for mounting said coolant diverter in said fuel rod spacer between adjacent fuel rods, wherein said mounting means includes a diverter tube for mounting said coolant diverter and for guiding the two phase coolant flow along said coolant diverter; said stem portion being fixedly arranged within said diverter tube.

* * * * *